(12) United States Patent
Lains et al.

(10) Patent No.: US 8,490,402 B2
(45) Date of Patent: Jul. 23, 2013

(54) AFTERBURNER CHAMBER FOR A TURBOMACHINE

(75) Inventors: Dominique Maurice Jacques Lains, Melun (FR); Nicolas Leblond, Lieusaint (FR); Denis Jean Maurice Sandelis, Nangis (FR)

(73) Assignee: SNECMA, Paris (FR)

( * ) Notice: Subject to any disclaimer, the term of this patent is extended or adjusted under 35 U.S.C. 154(b) by 459 days.

(21) Appl. No.: 12/694,622

(22) Filed: Jan. 27, 2010

(65) Prior Publication Data

US 2010/0218505 A1   Sep. 2, 2010

(30) Foreign Application Priority Data

Mar. 2, 2009   (FR) ...................................... 09 00932

(51) Int. Cl.
  *F02K 3/10*   (2006.01)
(52) U.S. Cl.
  USPC .................... 60/765; 60/761; 60/762; 60/766
(58) Field of Classification Search
  USPC ..................................... 60/761, 762, 765, 766
  See application file for complete search history.

(56) References Cited

U.S. PATENT DOCUMENTS

| 5,400,589 | A | * | 3/1995 | Mahias et al. | 60/762 |
| 7,584,615 | B2 | * | 9/2009 | Baboeuf et al. | 60/762 |
| 2006/0016193 | A1 | * | 1/2006 | Roche et al. | 60/761 |
| 2007/0227152 | A1 | * | 10/2007 | Bunel et al. | 60/761 |
| 2009/0113894 | A1 | * | 5/2009 | Mayer et al. | 60/765 |

FOREIGN PATENT DOCUMENTS

| EP | 1 619 377 A1 | 1/2006 |
| EP | 1 621 817 A1 | 2/2006 |
| FR | 2 866 675 | 8/2005 |

* cited by examiner

*Primary Examiner* — Phutthiwat Wongwian
*Assistant Examiner* — Craig Kim
(74) *Attorney, Agent, or Firm* — Oblon, Spivak, McClelland, Maier & Neustadt, L.L.P.

(57) ABSTRACT

An afterburner chamber includes a burner ring having housed therein an annular fuel strip that is pierced by orifices and that is mounted inside an annular thermal protection tube, and an ignition spark plug penetrating into the inside of the burner ring. The protection tube and the burner ring have orifices for passing air. The chamber also includes a device for ventilating the orifices of the fuel strip that are situated in the immediate vicinity of the spark plug.

8 Claims, 2 Drawing Sheets

AFTERBURNER CHAMBER FOR A TURBOMACHINE

FIELD OF THE INVENTION

The present invention relates to an afterburner chamber for a turbomachine such as a bypass turbojet for an airplane.

BACKGROUND OF THE INVENTION

In conventional manner, a turbojet with afterburning comprises from upstream and downstream in the flow direction of the gas: at least one compressor; a combustion chamber; and at least one turbine with a reheat channel or afterburner chamber.

In general, the afterburner chamber comprises a burner ring that is open in a downstream direction and that has mounted therein a fuel ejector strip that is placed inside an annular thermal protection tube. The ejector strip is connected to fuel feeder means and includes ejector holes pointing downstream and in alignment with holes in the thermal protection tube. A spark plug is mounted on the burner ring and penetrates into the inside of the ring in the proximity of the fuel strip in order to ignite the fuel.

Air-passing orifices are formed in the burner ring and in the upstream wall of the thermal protection tube.

Nevertheless, in the prior art, in the immediate vicinity of the spark plug, the orifices in the burner ring are of diameter that is small compared with the orifices that are further away, and the thermal protection tube does not have any orifices in this location in order to encourage ignition of the afterburner by the spark plug.

In operation, the fuel ejector holes in the vicinity of the spark plug are nevertheless subjected to a fuel coking phenomenon because of the intense heat that exists in this zone, with this phenomenon leading to the fuel ejector holes in the vicinity of the spark plug becoming at least partially clogged and to difficulties or failures in igniting the afterburner chamber.

OBJECT AND SUMMARY OF THE INVENTION

A particular object of the invention is to avoid those drawbacks.

To this end, the invention proposes an afterburner chamber for a turbomachine, the afterburner chamber comprising a burner ring having housed therein an annular fuel strip that is pierced by orifices and that is mounted inside an annular thermal protection tube, and an ignition spark plug penetrating into the inside of the burner ring, the protection tube and the burner ring having orifices for passing air, the afterburner chamber being characterized in that it includes means for ventilating the orifices in the fuel strip that are situated in the immediate vicinity of the spark plug.

This specific ventilation of the orifices in the fuel strip in the immediate vicinity of the spark plug avoids these orifices becoming coked and solves the problems of igniting the afterburner.

The quantity of air conveyed to the vicinity of the spark plug remains unchanged, only the flow of the air stream in the vicinity of the orifices in the strip is modified, thereby serving to avoid changing the richness of the air-fuel mixture (i.e. the ratio of the fuel flow rate divided by the associated air flow rate), and thus makes it possible to conserve the same performance for the afterburner chamber.

According to another characteristic of the invention, the ventilation means include orifices formed in the upstream wall of the protection tube and pointing towards the spark plug, thereby enabling the ventilation air to be directed preferentially towards those ejector orifices of the strip that are adjacent to the spark plug.

Advantageously, the orifices in the upstream wall of the protection tube are in alignment with air-passing orifices in the burner ring, thereby enabling a fraction of the air flow to be pointed directly towards the orifices in the strip in the immediate vicinity of the spark plug, thus optimizing ventilation for avoiding the formation of coke.

In a preferred embodiment of the invention, the upstream wall of the protection tube includes four orifices co-operating with four orifices of the burner ring to constitute four pairs of orifices converging towards the spark plug.

Preferably, the four orifices of the burner ring comprise two air-passing orifices of larger diameter on either side of the spark plug and two orifices of smaller diameter situated in the vicinity of the spark plug between the two orifices of larger diameter.

The orifices in the protection tube forming portions of the above-mentioned pairs may have substantially the same diameter as the smaller diameter orifices in the burner ring.

The invention also provides a turbojet including an annular afterburner chamber of the above-described type, said ring possibly being arranged in a secondary air stream.

BRIEF DESCRIPTION OF THE DRAWINGS

The invention can be better understood and other details, advantages, and characteristics of the invention appear on reading the following description made by way of non-limiting example with reference to the accompanying drawings, in which.

MORE DETAILED DESCRIPTION

Figure 1:
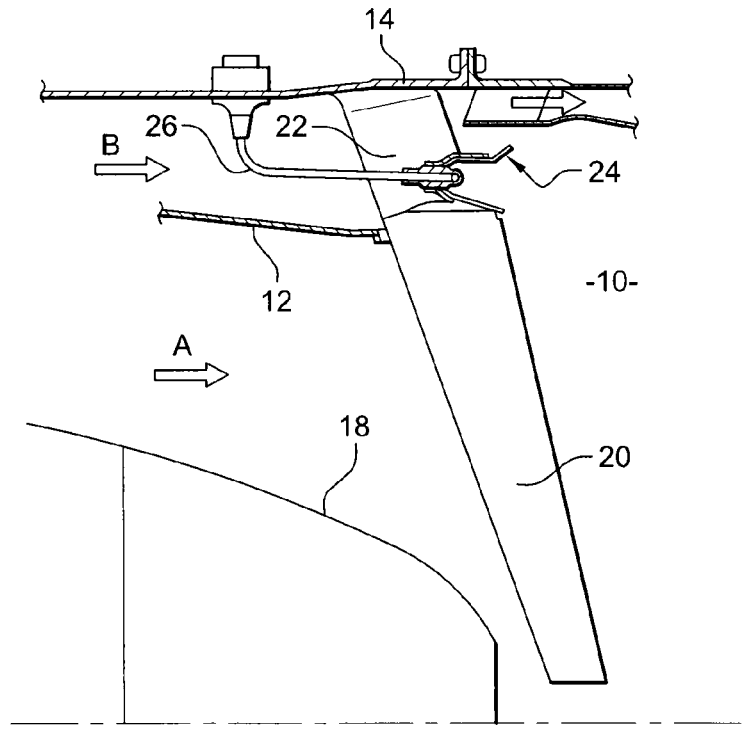
FIG. 1 is a fragmentary diagrammatic view in axial section of an afterburner chamber of the prior art.
Figure 2:
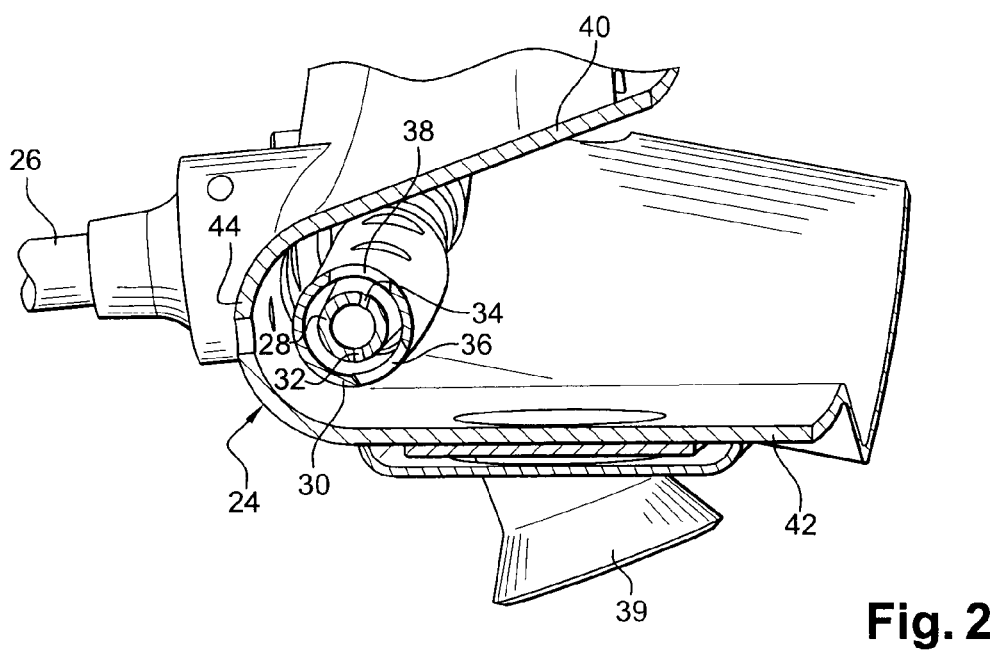
FIG. 2 is a partially-cutaway diagrammatic perspective view of the burner ring of the afterburner chamber of FIG. 1.
Figure 3:
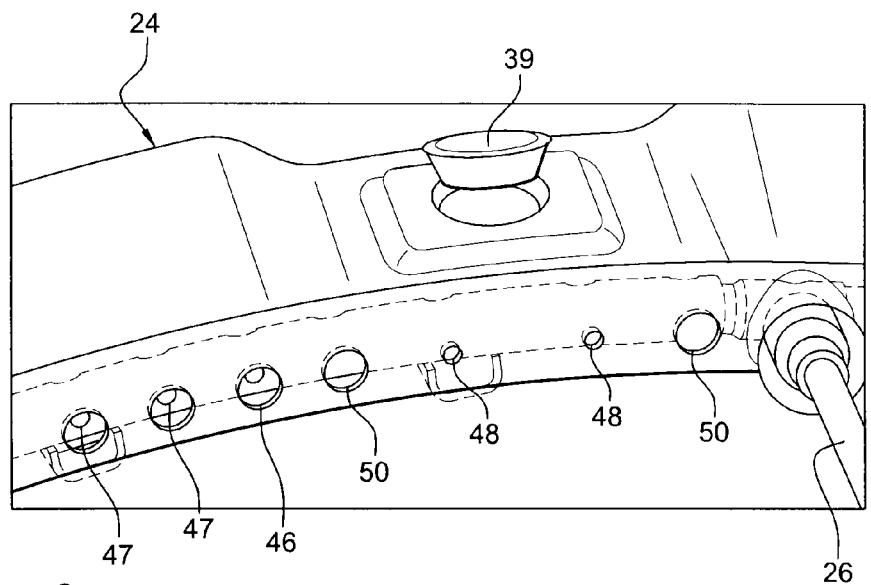
FIG. 3 is a diagrammatic perspective view from the upstream end of the burner ring of FIG. 2.

Reference is made initially to FIGS. 1 and 2 that show a prior art afterburner chamber 10 situated between the turbine and the outlet nozzle of a bypass turbojet.

The afterburner chamber 10 has a substantially cylindrical wall 12 separating the primary and secondary streams (arrows A and B respectively), which wall is mounted inside an outer cylindrical exhaust casing 14 and around an exhaust cone 18 of the turbojet. The wall 12 and the casing 14 define between them an outer annular flowsection in which there flows the cool or secondary stream (arrow B) of the turbojet as generated by a fan at the upstream end of the turbojet and serving both to increase thrust and to ventilate the components of the turbojet. The wall 12 co-operates with the exhaust cone 18 to define an inner annular flowsection in which there flows the hot or primary stream (arrow A) of the turbojet, which stream is constituted by the exhaust gas from the combustion chamber of the turbojet. The primary and secondary streams are mixed together in part downstream from the wall 12 so as to increase the thrust of the turbojet.

Flame-holder arms 20 extend radially through the primary air stream leaving the turbine, the radially outer ends thereof having tabs 22 passing through the secondary air stream in order to fasten the flame-holder arms 20 to the outer casing 14.

A burner ring 24 having a downstream annular opening is mounted on the radially outer ends of the flame-holder arms 20 inside the secondary air stream. A fuel ejector strip is housed inside the ring of the burner 24 and is connected to fuel feed means outside the casing 14 by angled ducts 26 that pass axially between the tabs 22 for fastening the arms 20.

As shown in FIG. 2, the fuel strip 28 is mounted inside an annular tube 30 for protecting the strip from the radiation from the flames downstream. The strip has pairs of fuel ejector orifices 32, 34 that are distributed regularly around the axis of the turbojet. By way of example, the orifices in any given pair are situated in the same axial plane, and they are formed in the downstream wall of the strip 28.

The protection tube 30 has pairs of orifices 36, 38 in alignment that co-operate with the pairs of orifices 32, 34 of the strip 28, and that have a diameter that is larger than that of the orifices 32, 34 of the strip 28 in order to accommodate the flare of the jet of fuel.

A spark plug (not shown) is engaged in a sleeve 39 so that its ignition electrodes project into the inside of the burner ring 24 downstream from the fuel strip 28.

The burner ring 28 has a V-shaped section with radially inner and outer walls 40 and 42 that extend downstream. The upstream wall 44 of the burner ring is of convex rounded shape and has axial orifices 46 for passing air that are distributed around its circumference, the two orifices 48 that are situated level with the spark plug being of smaller diameter than the other orifices 46. The large-diameter orifices 46 are in axial alignment with orifices 47 in the upstream wall of the protection tube 30, but the small-diameter orifices 48 and the two large-diameter orifices 50 situated on either side of the spark plug and immediately adjacent to the two small-diameter orifices 48 are not in axial alignment with orifices 47.

In operation, the fuel is injected via the orifices 32, 34 of the strip 28 through the orifices 36, 38 of the protection tube 30 and impacts against the inner and outer walls 40 and 42 of the burner ring 24, thereby causing the fuel to be atomized. In operation, this configuration induces coke to form on the fuel ejector orifices 30, 32 in the immediate vicinity of the spark plug, thereby leading to problems of igniting the afterburner.

The invention provides a solution to this problem by incorporating means for ventilating the orifices 30, 32 of the strip 28 that are situated in the immediate vicinity of the spark plug. These means comprise orifices 52, 54 formed in the upstream wall of the protection tube 56. These orifices 52, 54 point towards the axis 58 of the spark plug and they are inclined relative to the axis of the turbojet.

Figure 4:
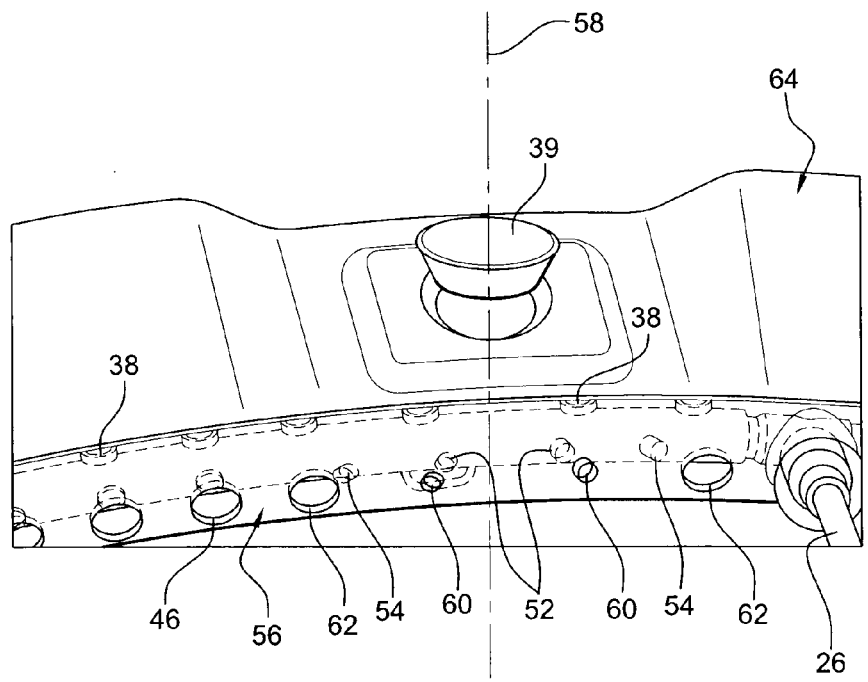
FIG. 4 is a diagrammatic perspective view from the upstream end of a burner ring of an afterburner chamber of the invention.

In a particular embodiment of the invention as shown in FIG. 4, the thermal protection tube includes four orifices 52, 54 that point towards the axis 58 of the spark plug and that are angularly spaced apart from one another. These orifices 52, 54 are associated with four orifices 60, 62 of the burner ring, comprising two orifices 62 of large diameter that are situated on either side of the spark plug, and two other orifices 60 of smaller diameter that are situated between the large diameter orifices 62.

The four orifices 60, 62 of the burner ring 64 and of the protection tube 56 thus form four pairs of orifices that are aligned in pairs on axes that converge towards the spark plug.

In operation, the air entering the burner ring 64 via these four orifices 60, 62 passes through the four orifices 52, 54 in the thermal protection tube 56 and serves specifically to cool the orifices 32, 34 in the fuel strip 28 situated in the vicinity of the spark plug, thereby avoiding these orifices becoming clogged and encouraging ignition of the afterburner.

Incorporating orifices in the upstream wall of the protection tube 56 in the immediate vicinity of the spark plug does not modify the ratio of fuel flow rate over air flow rate (fuel richness) in the vicinity of the spark plug, since the orifices 60, 62 of the burner ring 64 are identical to those of the prior art.

The orifices 52, 54 of the thermal protection tube 56 have substantially the same diameter as the small diameter orifices 60 of the burner ring 64, said diameter lying for example in the range about 0.6 millimeters (mm) to 1 mm.

The ventilation orifices in the burner ring and in the protection tube are made so as to be symmetrical about a plane containing the axis of the spark plug so as to guarantee that ventilation is uniform between the tube and the fuel strip in the vicinity of the spark plug.

Other configurations may be provided, and the invention is not limited to the embodiment described above. In particular, it is possible to modify the numbers of orifices in the thermal protection tube and in the burner ring in the immediate vicinity of the spark plug.

What is claimed is:

1. An afterburner chamber for a turbomachine comprising:
a burner ring having housed therein an annular fuel strip that is pierced by a first set of orifices and that is mounted inside an annular thermal protection tube;
and an ignition spark plug penetrating into the inside of the burner ring,
wherein the protection tube includes a second set of orifices for passing air and the burner ring includes a third set of orifices for passing air,
wherein the afterburner chamber includes means for ventilating the first set of orifices in the fuel strip that are situated in the immediate vicinity of the spark plug, and
wherein the ventilation means comprise the second set of orifices formed in an upstream wall of the protection tube and angled relative to an axis of the turbomachine, and axes of the second set of orifices point towards an axis of the spark plug, the axis of the spark plug being substantially perpendicular to the axis of the turbomachine.

2. The chamber according to claim 1, wherein the second set of orifices in the upstream wall of the protection tube are in alignment with the third set of orifices for passing air through the burner ring.

3. The chamber according to claim 2, wherein the upstream wall of the protection tube includes four orifices of the second set of orifices co-operating with four orifices of the third set of orifices of the burner ring to constitute four pairs of orifices converging towards the spark plug.

4. The chamber according to claim 3, wherein the four orifices of the burner ring of the third set of orifices comprise two air-passing orifices of larger diameter on either side of the spark plug and two orifices of smaller diameter situated in the vicinity of the spark plug between the two orifices of larger diameter.

5. The chamber according to claim 4, wherein the orifices of the second set of orifices in the protection tube forming parts of the pairs are of substantially the same diameter as the orifices of smaller diameter of the burner ring of the third set of orifices.

6. A turbojet comprising an annular afterburner chamber according to claim 1.

7. The turbojet according to claim 6, wherein the burner ring is arranged in a secondary air stream.

8. The chamber according to claim 3, wherein the four orifices of the second set of orifices in the upstream wall of the protection tube are symmetrical about a plane containing the axis of the spark plug.

* * * * *